(12) United States Patent
Hahn et al.

(10) Patent No.: US 10,101,918 B2
(45) Date of Patent: Oct. 16, 2018

(54) SYSTEMS AND METHODS FOR GENERATING HINT INFORMATION ASSOCIATED WITH A HOST COMMAND

(71) Applicant: SanDisk Technologies Inc., Plano, TX (US)

(72) Inventors: Judah Gamliel Hahn, Ofra (IL); Joseph R. Meza, Aliso Viejo, CA (US); William L. Guthrie, Santa Cruz, CA (US)

(73) Assignee: SanDisk Technologies LLC, Plano, TX (US)

( * ) Notice: Subject to any disclaimer, the term of this patent is extended or adjusted under 35 U.S.C. 154(b) by 179 days.

(21) Appl. No.: 14/601,350

(22) Filed: Jan. 21, 2015

(65) Prior Publication Data

US 2016/0210045 A1 Jul. 21, 2016

(51) Int. Cl.
*G06F 12/00* (2006.01)
*G06F 3/06* (2006.01)

(52) U.S. Cl.
CPC .............. *G06F 3/061* (2013.01); *G06F 3/064* (2013.01); *G06F 3/0659* (2013.01); *G06F 3/0688* (2013.01)

(58) Field of Classification Search
None
See application file for complete search history.

(56) References Cited

U.S. PATENT DOCUMENTS

| 8,775,742 | B2 | 7/2014 | Duvvuru |
| 8,898,424 | B2 | 11/2014 | Manning et al. |
| 2009/0030868 | A1 | 1/2009 | Ramesh |
| 2013/0020707 | A1* | 1/2013 | Or-Bach ................ B82Y 10/00 257/741 |
| 2013/0031298 | A1 | 1/2013 | Tan |
| 2014/0289492 | A1* | 9/2014 | Ranjith Reddy ..... G06F 3/0613 711/170 |
| 2014/0337560 | A1 | 11/2014 | Chun et al. |
| 2016/0054934 | A1* | 2/2016 | Hahn .................... G06F 3/0613 711/103 |
| 2016/0188687 | A1* | 6/2016 | Nair ........................ G06F 3/067 707/602 |

OTHER PUBLICATIONS

International Search Report and Written Opinion in International Application No. PCT/US2017/019122, dated May 30, 2017, 14 pages.
International Search Report in PCT Application No. PCT/US2015/062926, dated Jul. 25, 2017.

* cited by examiner

*Primary Examiner* — Baboucarr Faal
(74) *Attorney, Agent, or Firm* — Brinks Gilson & Lione

(57) ABSTRACT

Systems and methods for generating hint information associated with a host command are disclosed. In one implementation, a processor of a host system determines whether the host system has initiated a procedure that will send a command to a non-volatile memory system. The processor analyzes at least one of metadata or payload data associated with the command to determine whether the processor is able to generate hint information associated with the at least one of metadata or payload data. The processor generates hint information based on the analysis of the at least one of metadata or payload data, sends the hint information to the non-volatile memory system, and sends the command to the non-volatile memory system.

22 Claims, 8 Drawing Sheets

SYSTEMS AND METHODS FOR GENERATING HINT INFORMATION ASSOCIATED WITH A HOST COMMAND

BACKGROUND

Current random-access flash memory systems such as solid state drives often have no inherent seek penalty in accessing data stored at the memory system. However, memory systems are often able to access data that is stored in parallel across memory blocks in different memory die more efficiently than memory systems are able to access data that is stored sequentially in memory blocks of the same memory die.

In order to take advantage of this property of flash memory systems, it would be advantageous for a memory system to know how a host system will later access data prior to the memory system storing the data in memory of the memory system.

SUMMARY

In one aspect, a method is disclosed. The elements of the method are performed with a processor of a host system. The processor determines whether the host system has initiated a procedure that will send a command to a non-volatile memory system. The processor analyzes at least one of metadata or payload data associated with the command to determine whether the processor is able to generate hint information associated with the at least one of metadata or payload data.

The processor of the host system generates hint information based on the analysis of the data; sends the hint information to the non-volatile memory system; and sends the command to the non-volatile memory system.

In another aspect, a host system is disclosed. The host system includes processing circuitry and a driver module in communication with the processing circuitry.

The processing circuitry is configured to generate, based on at least one of metadata or payload data associated with a command that the host system is going to send to the non-volatile memory system, information regarding a characteristic of data associated with the command.

The driver module is configured to send to the non-volatile memory system the generated information in conjunction with the host system sending the command to the storage module.

In a further aspect, another method is disclosed. In the method, a non-volatile memory system receives information from a hint generator present on a host system, the information indicating to the non-volatile memory system a characteristic of data associated with a command.

The non-volatile memory system receives the command from the host system, selects a procedure for storing the data in a non-volatile memory of the non-volatile memory system based on the information indicating the characteristic of the data, and performs the selected procedure.

DETAILED DESCRIPTION OF THE DRAWINGS

The present disclosure is directed to systems and methods for generating hint information associated with host commands. Random-access flash memory systems often have no inherent penalty in accessing data stored at the memory system. However, memory systems are often able to access data that is stored in parallel across memory blocks in different memory die more efficiently than memory systems are able to access data that is stored sequentially in memory blocks of the same memory die.

As discussed in more detail below, in order to take advantage of this efficiency, a hint generator present on a host system monitors host system actions and passes hint information to a non-volatile memory system. The memory system utilizes the received hint information when the memory system receives host commands from the host system in order to more efficiently process and/or store data in non-volatile memory of the memory system.

Figure 1A:
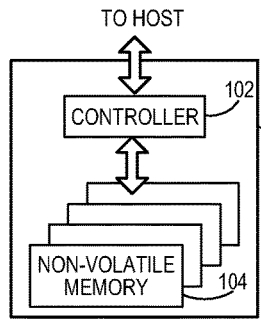
FIG. 1A is a block diagram of an example non-volatile memory system.

FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory technologies, now known or later developed. Also, the memory cells can be arranged in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A non-volatile memory system 100 includes a single channel between controller 102 and non-volatile memory die 104, the subject matter described herein is not limited to having a single memory channel. For example, in some NAND memory system architectures, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
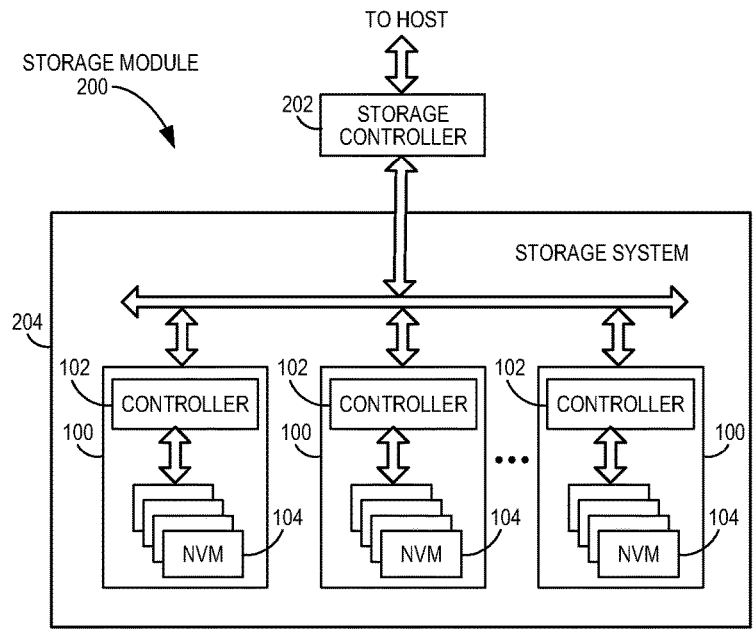
FIG. 1B is a block diagram illustrating an exemplary storage module.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
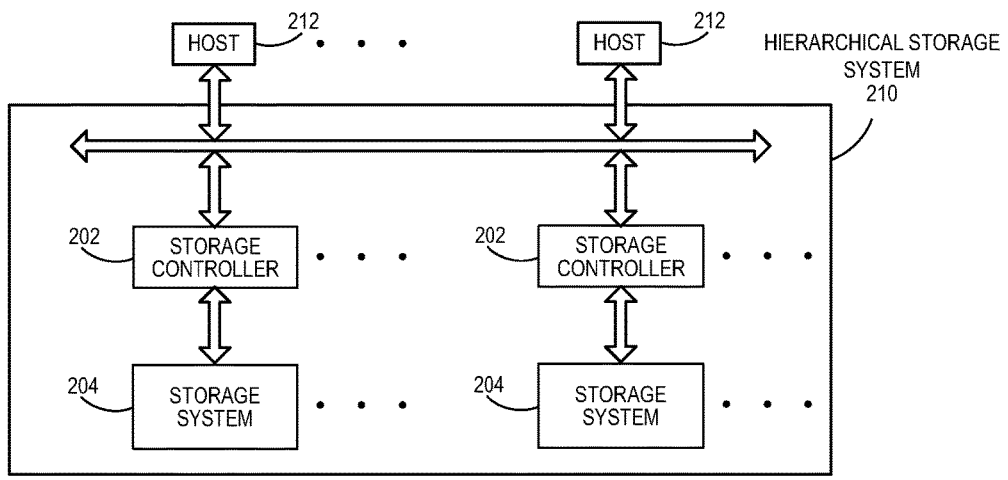
FIG. 1C is a block diagram illustrating a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
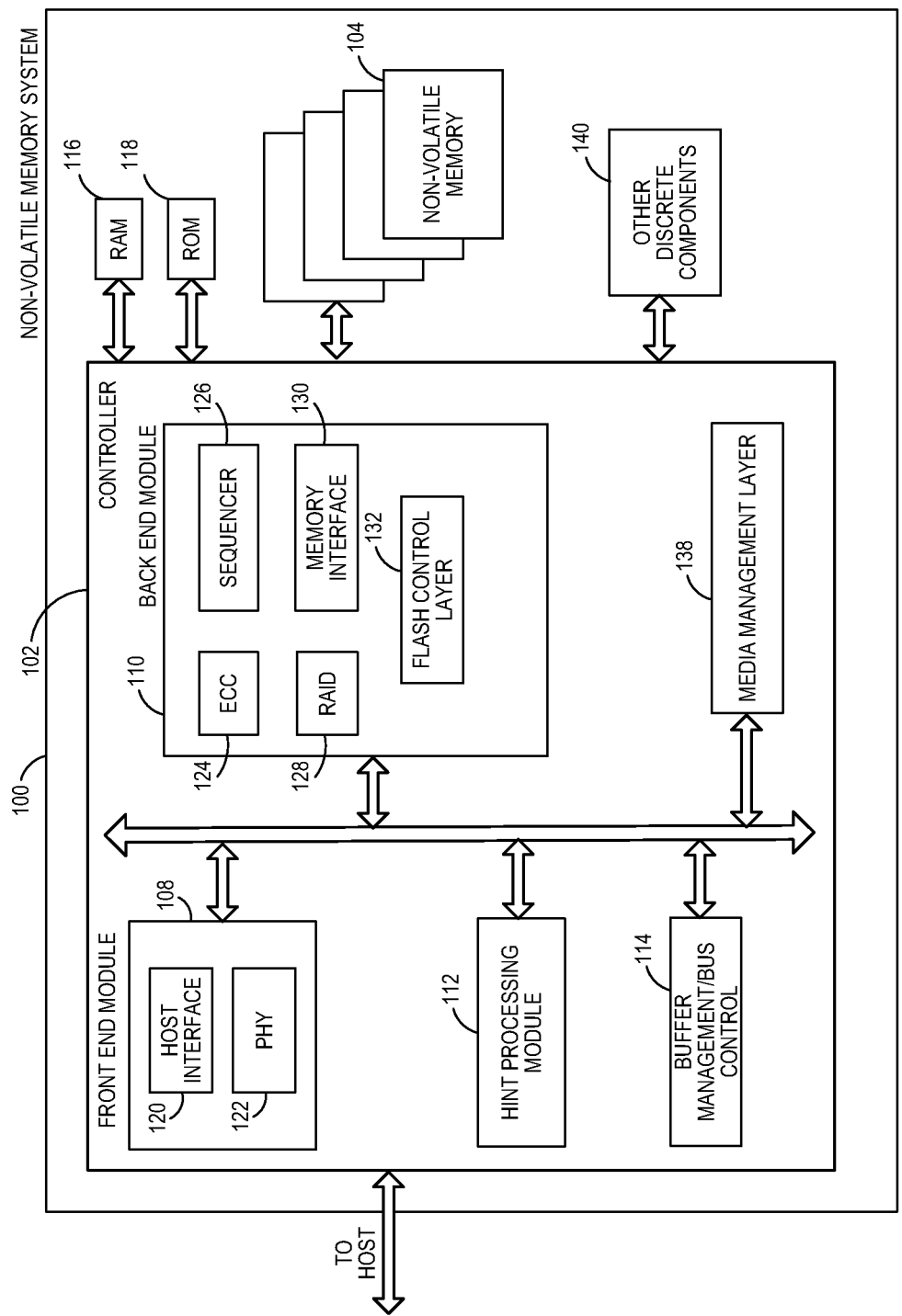
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a hint processing module 112. As discussed in more detail below in conjunction with FIGS. 5-8, the hint processing module 112 processes hint information received from a hint generator present on the host system and may select a procedure for processing data based on characteristics of data identified in the hint information.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102.

In alternative embodiments, one or more of the physical layer interface 122, RAID module 128, media management layer 138 and buffer management/bus controller 114 are optional components that are not necessary in the controller 102.

Figure 2B:
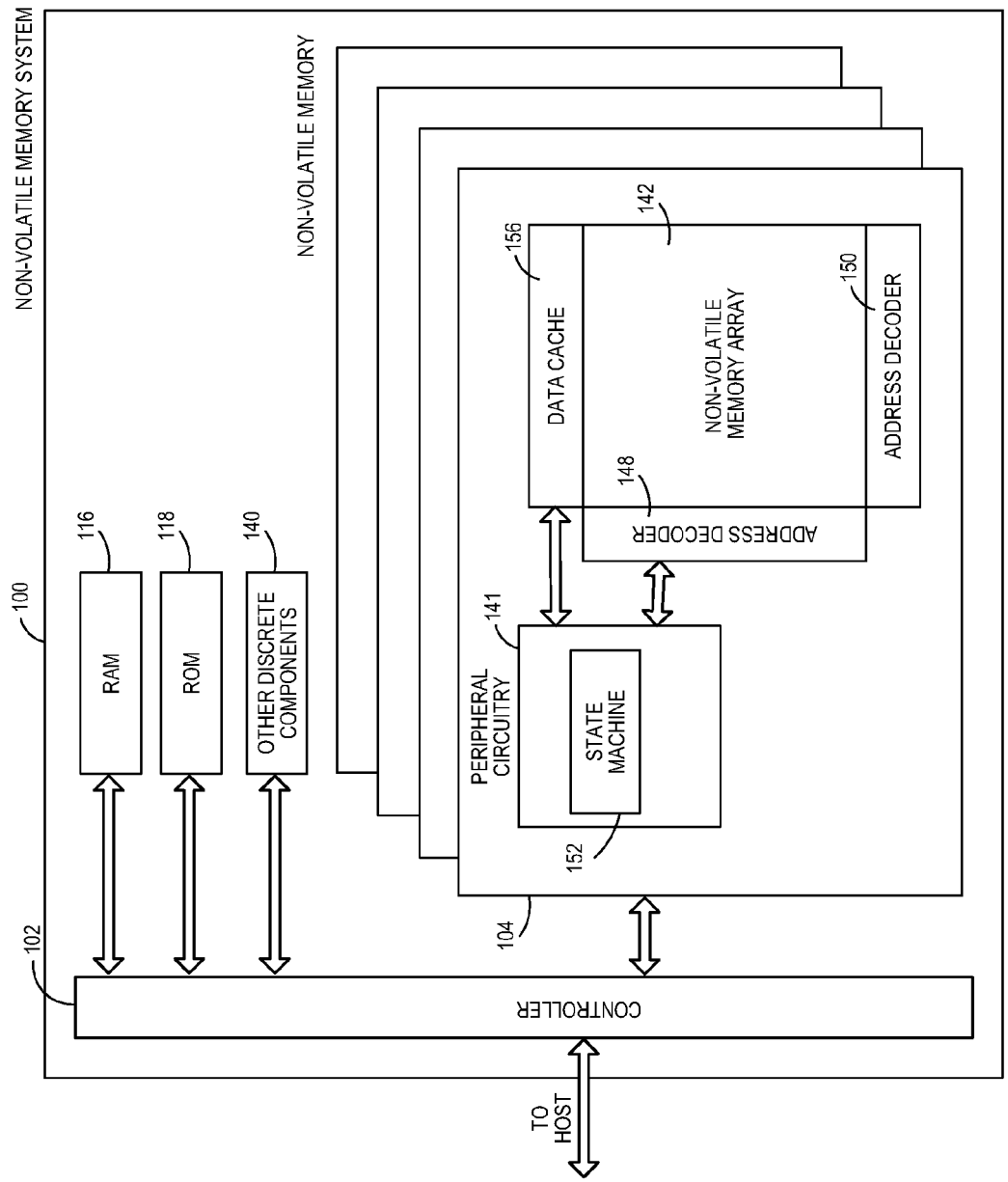
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

Figure 3:
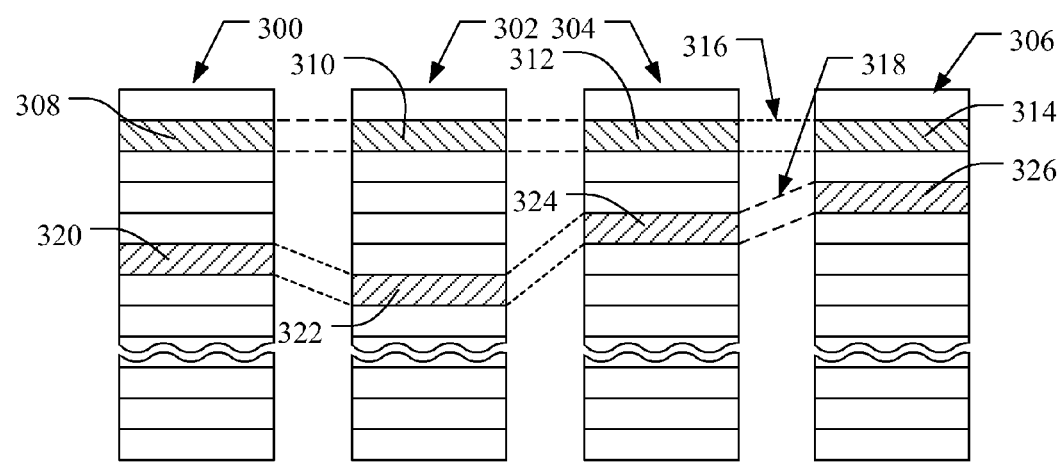
FIG. 3 illustrates an example physical memory organization of a memory bank.

FIG. 3 conceptually illustrates a multiple plane arrangement showing four planes 302-308 of memory cells. These planes 302-308 may be on a single die, on two die (two of the planes on each die) or on four separate die. Of course, other numbers of planes, such as 1, 2, 8, 16 or more may exist in each die of a system. The planes are individually divided into blocks of memory cells shown in FIG. 3 by rectangles, such as blocks 310, 312, 314 and 316, located in respective planes 302-308. There can be dozens or hundreds of blocks in each plane.

As mentioned above, a block of memory cells is the unit of erase, the smallest number of memory cells that are physically erasable together. Some memory systems, for increased parallelism, operate the blocks in larger metablock units. However, other memory systems may utilize asynchronous memory die formations rather than operating in larger metablock units.

In memory systems utilizing metablock units, one block from each plane is logically linked together to form the metablock. The four blocks 310-316 are shown to form one metablock 318. All of the cells within a metablock are typically erased together. The blocks used to form a metablock need not be restricted to the same relative locations within their respective planes, as is shown in a second metablock 320 made up of blocks 322-328. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 4:
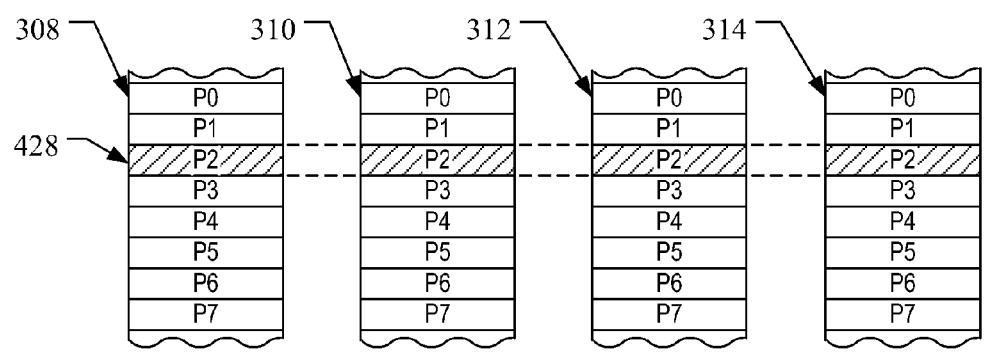
FIG. 4 shows an expanded view of a portion of the physical memory of FIG. 3.

The individual blocks are in turn divided for operational purposes into pages of memory cells, as illustrated in FIG. 4. The memory cells of each of the blocks 310-316, for example, are each divided into eight pages P0-P7. Alternatively, there may be 32, 64 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage 428 is illustrated in FIG. 4, being formed of one physical page from each of the four blocks 310-316. The metapage 402, for example, includes the page P2 in each of the four blocks but the pages of a metapage need not necessarily have the same relative position within each of the blocks.

As mentioned above, non-volatile memory systems are often able to access data that is stored in parallel across memory blocks in different memory die more efficiently than memory systems are able to access data that is stored sequentially in memory blocks of the same memory die. However, without knowing access patterns for which a host system will access data stored at the non-volatile memory system, it is difficult for the memory system to take advantage of this efficiency and to store data in parallel across memory blocks in different memory die for data that the host system will access at once.

Figure 5:
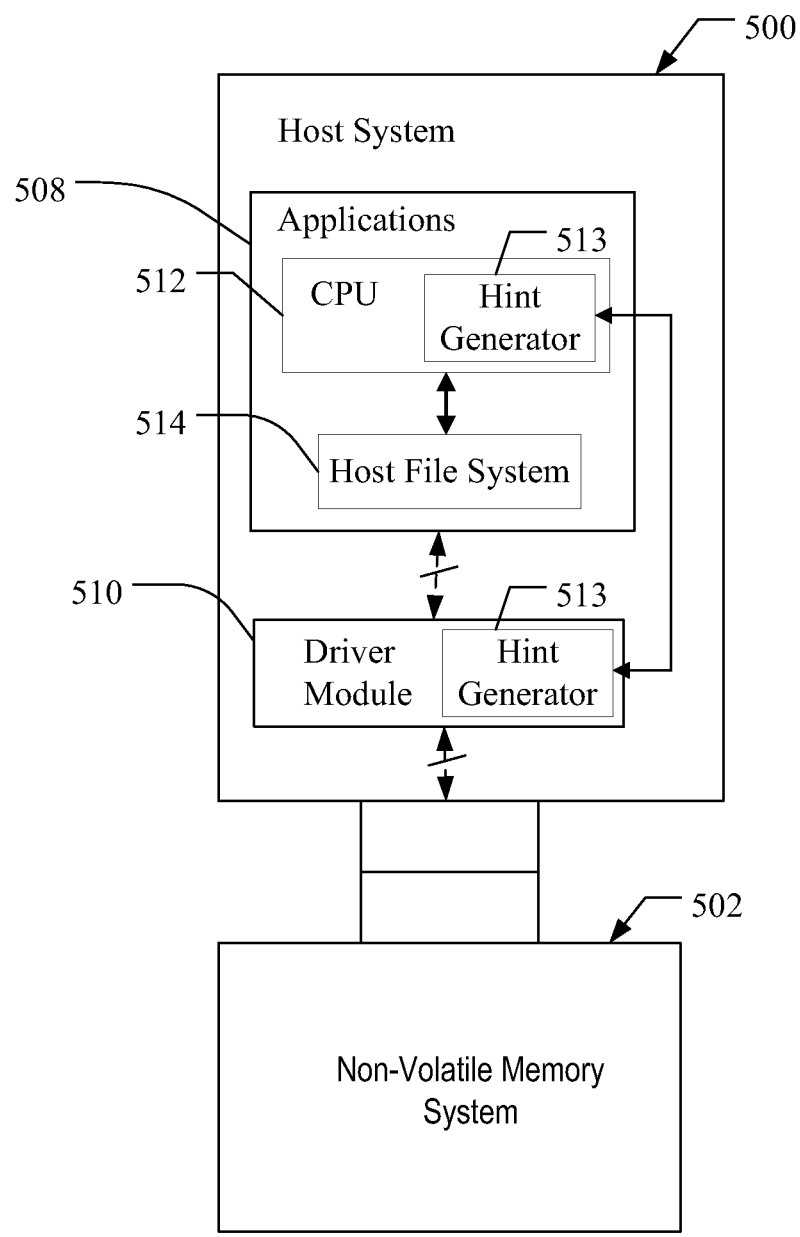
FIG. 5 is a block diagram of one implementation of a host system coupled with a non-volatile memory system.

The non-volatile memory systems described herein may utilize information from hint generators positioned on host systems in order to more intelligently process and store data in non-volatile memory of the memory system. FIG. 5 is a block diagram of one implementation of a host system coupled with a non-volatile memory system such as those described above.

A host system 500 stores data into and retrieves data from a non-volatile memory system 502 such as those described above in conjunction with FIGS. 1A-4. The host system 500 may be viewed as having two major parts, in so far as the non-volatile memory system 502 is concerned, made up of a combination of circuitry and software. They are an applications portion 508 and a driver module portion 510 that interfaces with the non-volatile memory system 502.

The applications portion 508 can include, for example, a CPU processor 512 (also referred to as processing circuitry) running word processing, graphics, control or other popular application software, as well as the host file system 514 for managing data on the host 500.

As discussed in more detail below, the application portions 508 may also include the hint generator 513 that monitors host system processes that initiate and send host commands to the storage module. The hint generator 513 may be implemented as an application running on the CPU processor 512 that is not part of an operating system present on the host system. The hint generator 513 may alternatively be implemented using processing circuitry.

In some implementations, the hint generator 513 may be at least partially integrated with the driver module portion 510 in order to send hint information to the storage module 502 as part of host commands.

Generally, the hint generator 513 looks for host commands and associated data that the host system is going to send to the non-volatile memory system 502. In some implementations, the hint generator 513 initiates the procedure that results in the host system sending the host command and associated data to the non-volatile memory system. However, in other implementations, the hint generator does not initiate the procedure that results in the host system sending the host command and associated data to the non-volatile memory system.

The host command and associated data may be the result of the host system intending to install an application on the non-volatile memory system, to store data for a new file on the non-volatile memory system, to replace data for a file stored on the non-volatile memory system, to delete content from a file, to delete an entire file, to execute the contents of a file, to read a file in a memory-mapped fashion, or to stream data sequentially from a file stored on the non-volatile memory system, for example.

After identifying host commands and associated data that the host system is going to send to the non-volatile memory system, the hint generator 513 may analyze at least one of metadata or payload data associated with the identified host commands. The metadata may be information that describes one or more characteristics of the data that is sent with the identified host commands and the payload data may be the actual data that is sent with the identified host commands. For example, the metadata may describe properties of a file that consists of the data that the host will be sending to the storage device for storage. Payload data is the data of an actual file that the host will be sending to the storage device.

The hint generator 513 generates hint information based on the analysis and characteristics of the data, and the hint generator 513 sends the generated hint information to the non-volatile memory system. The hint information may provide information regarding characteristics of the data that the host system will send to the non-volatile memory system such as whether or not the data will be updated frequently, a file type for the data such as whether the file is an executable file, sequences of logical block addresses associated with the data, whether the data is part of an existing file, whether the data replaces data of an existing file, whether the data is a copy of a file already stored at the non-volatile memory system, or any other type of information that may be useful to the non-volatile memory system when processing and/or storing data.

One example of a protocol that the hint generator 513 may utilize to pass hint information to the non-volatile memory system is described in the NVMe 1.2 standard specification that is available at www.nvmexpress.org. For example, the hint generator 513 may utilize the described Access Frequency (AF) field that indicates how often data is read or written, Sequential Read (SR) field that indicates data should be optimized for sequential read access, and/or Sequential Write (SW) field that indicates data should be optimized for sequential write access. The hint generator 513 may send these fields to the non-volatile memory system together with read and write commands.

Figure 6:
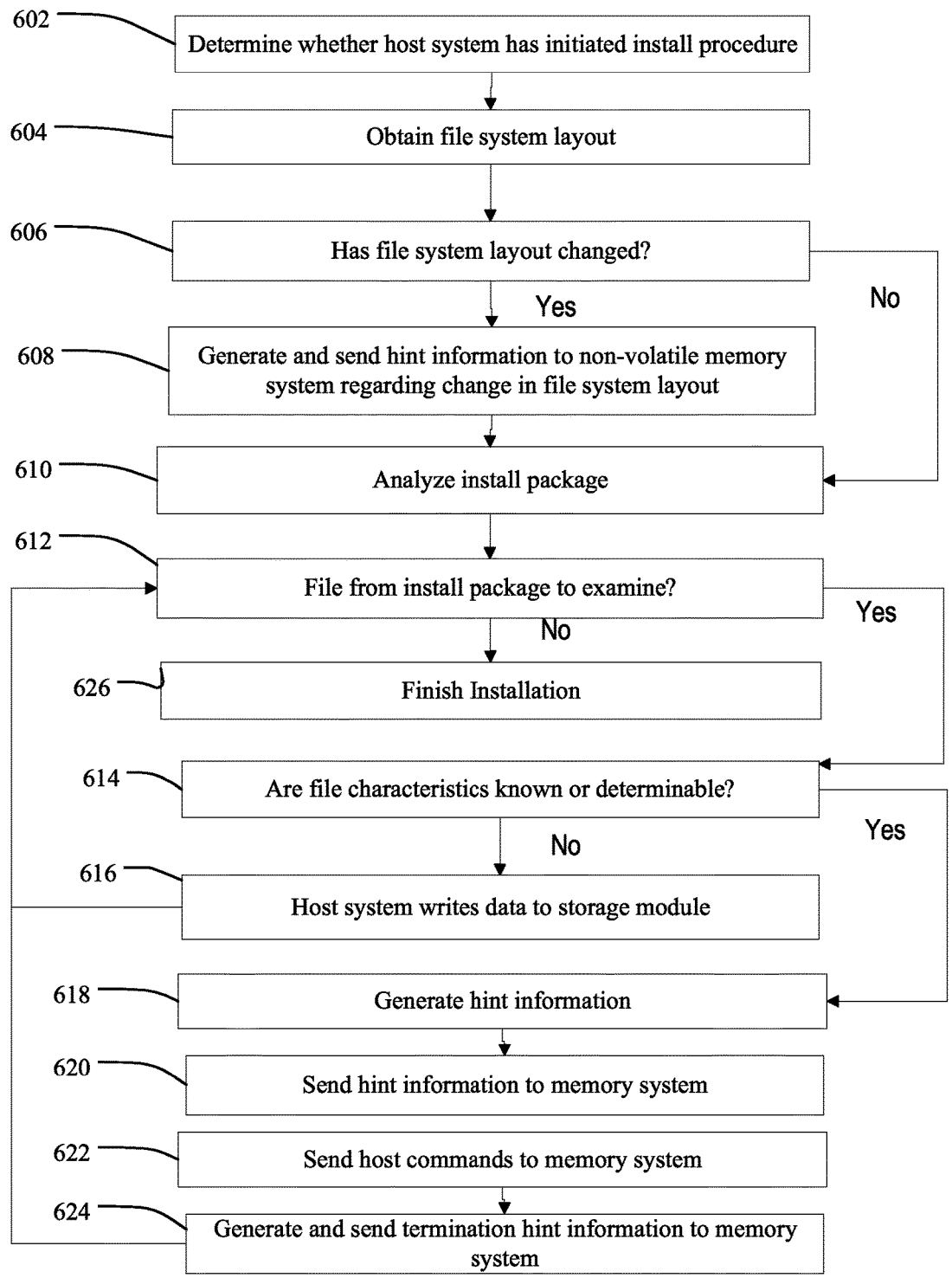
FIG. 6 is a flow chart of one implementation of a method for a hint generator to generate hint information in response to a host system initiating a process to install an application on a non-volatile memory system.
Figure 7:
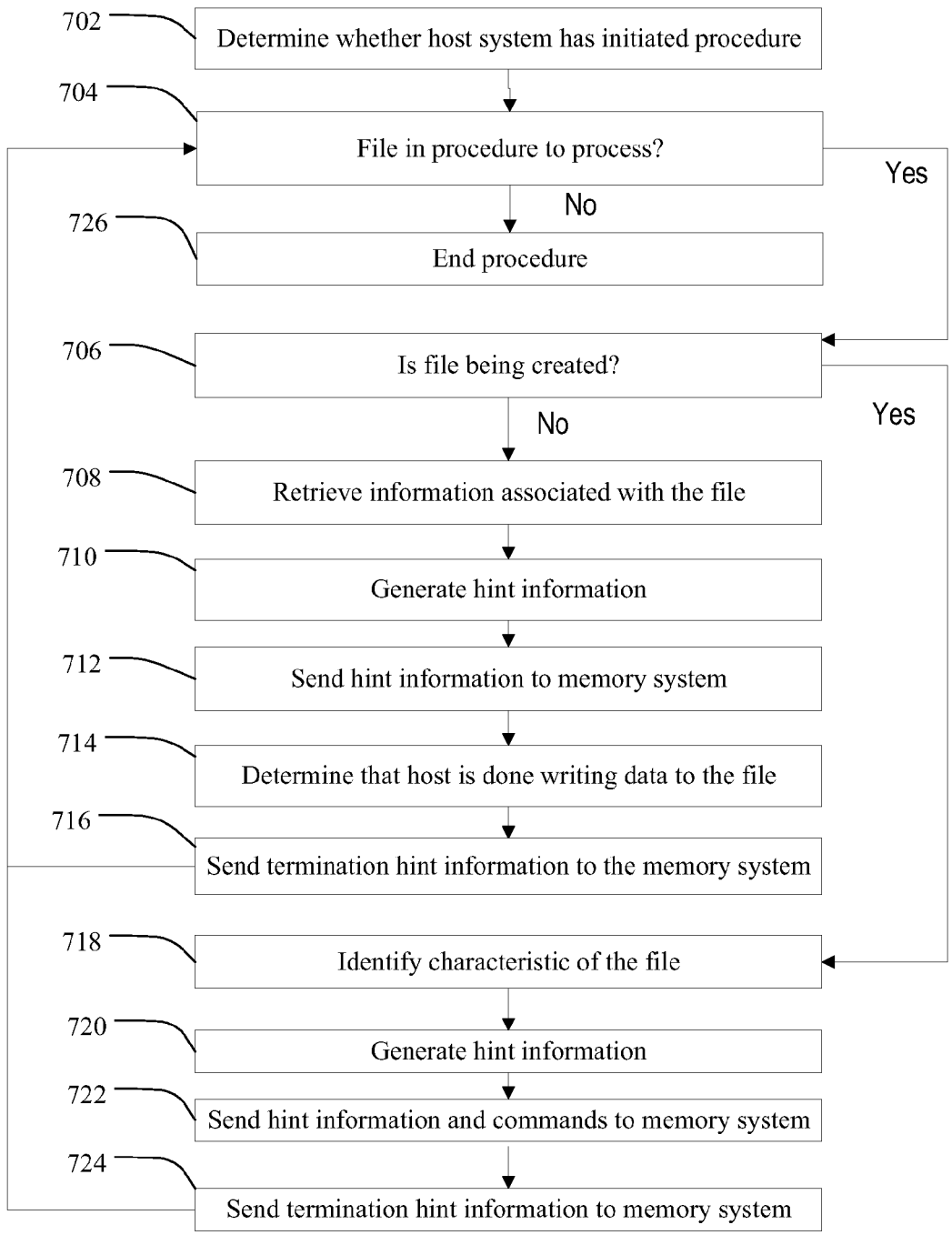
FIG. 7 is a flow chart of one implementation of a method for a hint generator to generate hint information in response to a host system initiating a process to create a file or to open a file on a non-volatile memory system.
Figure 8:
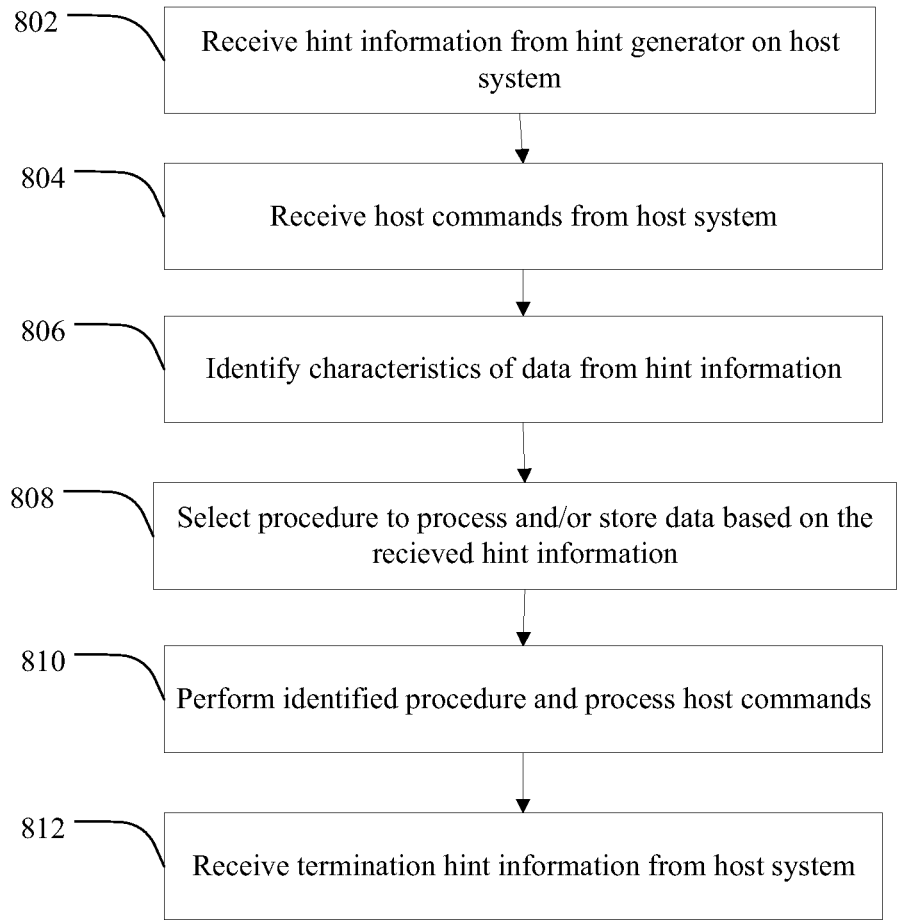
FIG. 8 is a flow chart of one implementation of a method for a non-volatile memory system to receive and utilize hint information to efficiently process and/or store data at the non-volatile memory system.

Below, the discussion with respect to FIGS. 6 and 7 illustrate implementations of methods for the hint generator to generate hint information and to send the hint information to a non-volatile memory system. The discussion with respect to FIG. 8 illustrates implementations of methods for how the non-volatile memory system may receive and utilize the hint information to efficiently process and/or store data at the non-volatile memory system.

FIG. 6 is a flow chart of one implementation of a method for a hint generator to generate hint information in response to a host system initiating a process to install an application on a non-volatile memory system. As discussed above, a hint generator is present on a host system and monitors actions of the host system.

At step 602, the hint generator determines that a host system has initiated a procedure to install an application on a non-volatile memory system that is coupled with the host system. In some implementations, the hint generator is integrated on the host system with a host utility that installs the application on the non-volatile memory system to assist the hint generator in identifying when the host system initiates procedures to install an application on the non-volatile memory system. For example, the hint generator may be integrated with an installation service provided by an operating system or with a setup script supplied with an application.

In some implementations, before analyzing an install package, the hint generator first analyzes a file system layout after determining that the host system has initiated a procedure to install an application on a non-volatile memory system. The hint generator analyzes the file system layout to determine which file extents are intended to be dynamically updated and which will be static after installation is complete. For example, application images (typically stored in a /bin, /usr/bin, or "\Program Files" directory) are typically static and are not frequently updated, while user data such as templates, examples, or user-modifiable resource files are typically dynamically updated. As known in the art, a file extent is a logically continuous area of storage in a file system reserved for a particular file.

At step 604, the hint generator obtains a file system layout from the host file system, and at step 606, the hint generator determines whether the file system layout has changed from a previous analysis of the file system layout. When the file system layout has not changed, the hint generator proceeds to analyze the install package at step 610.

However, when the file system layout has changed, at step 608, the hint generator generates and sends hint information regarding the new file system layout and sends the hint information to the non-volatile memory system. The hint information that the hint generator sends to the non-volatile memory system after analyzing a file system layout may include, for example, an indication of new files, an indication of whether specific files have changed or moved, an indication of updated file extents, and/or an indication of any new ranges of logical block addresses that will be static or not be frequently updated.

In some implementations, the hint generator sends the hint information to the non-volatile memory system using a pass-through application program interface ("API") provided by an operating system or using a device driver that is able to send commands directly to the storage module. In yet other implementations, when the hint generator is at least partially embedded with a device driver on the host system, the hint generator may embed the hint information in write commands that the host system sends to the non-volatile memory system.

At step 610, the hint generator analyzes the install package to identify one or more files that the resulting install will store on the non-volatile memory system.

At step 612, the hint generator examines a first file of the one or more files identified at step 610. In some implementations, the hint generator may examine at least one of metadata associated with the file or data of the actual file itself. At step 614, the hint generator determines whether characteristics of the file are known or can be determined. When characteristics of the file are not known and cannot be determined, the host system writes data for the file to the non-volatile memory system without hint information at step 616.

Alternatively, when the hint generator determines that characteristics of the file are known or can be determined, the hint generator generates hint information associated with the file at step 618. In some implementations, the hint information may include an indication for the non-volatile memory system of the frequency with which the data of the file will change, a sequence of logical block addresses associated with the file, and/or a file type associated with the data, such as whether the file is an executable file.

At step 620, the hint generator sends the hint information associated with the file to the non-volatile memory system, and at step 622, the host system sends one or more write commands containing the data of the file. As discussed above, in some implementations, the hint generator sends the hint information to the non-volatile memory system using a pass-through API provided by an operating system or using a device driver that is able to send commands directly to the non-volatile memory system. In yet other implementations, when the hint generator is at least partially embedded with a device driver on the host system, the hint generator may embed the hint information in write commands that the host system sends to the non-volatile memory system.

In some implementations, at step 624, after sending the hint information and the write commands containing the data for the file, the hint generator sends terminating hint information to the non-volatile memory system. The terminating hint information indicates to the non-volatile memory system that the host system has completed sending host commands to the non-volatile memory system for the present file and/or that the hint generator will not be sending further hint information to the non-volatile memory system regarding extents associated with the present file at this time.

It will be appreciated that the above-described process beginning at step 612 is repeated for each of the one or more files identified at step 610 until all the files are processed and the installation finished at step 626.

The hint generator present on the host system may perform similar actions when a host system initiates a process that while not part of an installation procedure, creates a file at a non-volatile memory system and/or opens an existing file at a non-volatile memory system.

FIG. 7 is a flow chart of one implementation of a method for a hint generator to generate hint information in response to a host system initiating a process to create or open a file on a non-volatile memory system. As discussed above, a hint generator is present on a host system and monitors actions of the host system.

At step 702, the hint generator monitors actions of the host system and determines that the host system has initiated a procedure to create one or more files on a non-volatile memory system and/or to open one or more file on a non-volatile memory system. At step 704, the hint generator determines whether a file identified as part of the procedure needs to be processed. When a file needs to be processed, at step 706, the hint generator determines whether the file is being created or whether the file is already stored at the non-volatile memory system.

When the hint generator determines that the file is already stored at the non-volatile memory system, at step 708 the hint generator may retrieve information associated with the file, such as metadata, that indicates characteristics of the file such as a sequence of logical block addresses associated with the file, a file type, or an indication of how frequently the data of the file is expected to change. The hint generator may extract this information using operating system interfaces that allow an application to read file characteristics and extent layout or by examining data structures within the host memory that describe the file extent layout. Additionally, the hint generator may examine actual file data to determine a file type.

At step 710, the hint generator may generate hint information based on the information associated with the file, and at step 712, the hint generator sends the hint information to the non-volatile memory system and the host system sends the commands associated with the file to the non-volatile memory system.

In some implementations, the hint generator may determine at step 714, that the host system has finished writing data to, or reading data from, the file that already exists at the non-volatile memory system. In response, at step 716, the hint generator sends termination hint information to the non-volatile memory system. The termination hint information indicates to the non-volatile memory system that the host system has closed the file and will no longer be sending host commands writing data to, or reading data from, extents associated with the file. Additionally, the termination hint information may indicate to the non-volatile memory system that the hint generator will not send further hint information to the non-volatile memory system regarding extents associated with the file at this time.

Referring again to step 706, when the hint generator instead determines that the host system is creating a new file for storage on the non-volatile memory system, at step 718, the hint generator identifies characteristics about the file to be created. For example, the hint generator may examine at least one of metadata associated with a file or the actual payload data of the file that will be sent with host commands to determine a sequence of logical block addresses to be associated with the file, a file type of the file, an indication of how frequently the data of the file is expected to change, an indication that the newly created file is a copy of a file that is already stored at the non-volatile memory system, and/or an indication that the newly created file is a temporary file that is a copy of a file that is already stored at the non-volatile memory system.

At Step 720, the hint generator generates hint information based on the identified characteristics, and at step 722, the hint generator sends the hint information to the non-volatile memory system and the host system sends the host commands to the non-volatile memory system.

In some implementations, after sending the hint information and the host commands to the non-volatile memory system, at step 724, the hint generator sends termination hint information to the non-volatile memory system.

It will be appreciated that the above-described method beginning at step 704 is repeated for each file identified at step 702 until all the files are processed and the procedure ends at step 726.

After the hint generator present on the host system sends hint information to the non-volatile memory system utilizing methods such as those described above in conjunction with FIGS. 6 and 7, the storage module utilizes the received hint information to efficiently process and/or store data for files associated with the host commands.

FIG. 8 is a flow chart of one implementation of a method for a non-volatile memory system receiving and utilizing hint information to efficiently process and/or store data at the non-volatile memory system. At step 802, a non-volatile memory system receives hint information from a hint generator present on a host system, and at step 804, the non-volatile memory system receives one or more host commands associated with the hint information.

As discussed above, in some implementations, the non-volatile memory system may receive the hint information in conjunction with the host commands through a pass-through API or from a device driver that is able to send commands directly to the non-volatile memory system. In other implementations, the non-volatile memory system may receive the hint information in conjunction with the host commands as part of a command received from the host system, such as a write command or a read command.

At step 806, a hint processing module of the controller of the non-volatile memory system identifies one or more characteristics of data for one or more files that the host device sends to the non-volatile memory system as part of the host commands. As discussed above, the hint information may identify, for example, whether or not data for a file will be updated frequently, a file type associated with data, sequences of logical block addresses associated with data for a file, whether data will replace data for a file already stored at the storage module, whether data will be appended to data for a file already stored at the storage module, whether the host system intends to read data for a file already stored at the storage module, and/or any other characteristic of data and/or a file that a hint generator may identify that a controller of the non-volatile memory system can utilize to more efficiently process and/or store data at the non-volatile memory system.

At step 808, the hint processing module selects, based on the received hint information, a procedure for processing and/or storing the data of the one or more files that the host device sends to the non-volatile memory system.

For example, when the hint information indicates that the data for the files will not be updated frequently such as when a host system is installing an executable file on the non-volatile memory system, the memory system may perform actions such as bypassing buffering modules within the memory system such as cache during a write procedure, and storing the data directly into long-term non-volatile memory of the non-volatile memory system. Reducing the use of buffering modules within the non-volatile memory system improves the overall endurance of the non-volatile memory system.

Additionally or alternatively, when the data for the files will not be frequently updated and the hint information includes a sequence of logical block addresses for the data of the file, the non-volatile memory system may segregate the data of the logical block addresses for storage into separate physical blocks of memory. The memory system then prevents the data of the file from being written in physical blocks of memory with other data that may be frequently updated. By storing the data in separate physical blocks of memory with other data that will not be frequently updated, write amplification within the non-volatile memory system is improved by reducing a number of second-generation copies of data that the controller of the non-volatile memory system needs to create as frequently updated data is modified.

When the hint information indicates a sequence of logical block addresses for the data of a file, such as when a host device installs an application on a non-volatile memory system or when the host device is creating and/or storing data to a file at the non-volatile memory system that will be read sequentially, the memory system may improve performance on future reads by storing data for the sequence of logical block addresses in a sequence of physical blocks of memory that correspond to a sequence with which the controller will read the data from the non-volatile memory. Storing the data of the files in such a sequence of physical blocks of memory allows the controller to efficiently read the data from the non-volatile memory rather than reading the data from physical blocks of memory randomly located throughout the non-volatile memory.

When the hint information indicates a sequence of logical block addresses for the data of a file, such as when a host systems opens a file to read data for a file that is stored at the storage module, the non-volatile memory system may load mapping tables associated with the data and begin to buffer data associated with the sequence of logical blocks so that the non-volatile memory system may provide the host system the requested data more quickly in response to read commands.

When the hint information indicates a sequence of logical blocks addresses for data that will overwrite data for a file already stored at the storage module, the non-volatile memory system may prepare to release the sequence of logical block addresses currently associated with the data of the file stored at the storage module.

When the hint information indicates a sequence of logical blocks addresses for data of a file is for a copy of a file presently stored at the storage module, the non-volatile memory system may copy the data from the physical blocks of memory where the data of the file is currently stored rather than storing the new data that is received from the host system.

When the hint information with respect to a copy of a file also indicates that the copy of the file is a temporary file, the non-volatile memory system may determine not to store the data for the copy of the temporary file in non-volatile memory and may instead keep the data for the copy of the temporary file in volatile memory until further hint information is received from the hint generator indicating that the temporary file has been closed at the host system.

At step 810, the non-volatile memory system performs the procedure identified based on the received hint information on the data received in the host commands and processes the host commands. In implementations where the hint generator sends termination hint information, the hint processing module may additionally receive termination hint information at step 812.

FIGS. 1-8 illustrate systems and methods for generating hint information associated with host commands. As discussed above, a hint generator positioned on a host system monitors actions of the host system and identifies host commands that the host system will send to a non-volatile memory system coupled to the host system.

The hint generator generates hint information based on at least one of metadata or payload data of files that the host system will send to the storage system with host commands, and provides the hint information to the non-volatile memory system. Using the hint information, non-volatile memory systems are able to efficiently store and manage resources of the storage module.

It is intended that the foregoing detailed description be regarded as illustrative rather than limiting, and that it be understood that it is the following claims, including all equivalents, that are intended to define the spirit and scope of this invention.

For example, in the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

The invention claimed is:
1. A method comprising:
performing in an application running on a host system, wherein the application is separate from a file system of the host system:

analyzing a layout of the file system to determine characteristics of different logically-contiguous areas in the file system layout;
sending, to a non-volatile memory system in communication with the host system, the determined characteristics of the different logically-contiguous areas in the file system layout;
determining whether the host system will send a write command to the non-volatile memory system;
in response to determining that the host system will send the write command to the non-volatile memory system, analyzing at least one of metadata or payload data associated with the write command;
generating hint information based on the analysis of the at least one of metadata or payload data; and
sending the hint information to the non-volatile memory system;
wherein by sending the determined characteristics of the different logically-contiguous areas in the file system layout and the hint information, the application provides the non-volatile memory system with information otherwise unavailable from the file system of the host system.

2. The method of claim 1, wherein the write command is part of a procedure to install an application on the non-volatile memory system.

3. The method of claim 1, wherein analyzing at least one of the metadata or the payload data comprises:
analyzing an install package to identify one or more files associated with the install package; and
for each of the one or more files, determining a characteristic of the file.

4. The method of claim 1, further comprising:
analyzing the file system layout to determine if the file system layout has changed since a previous analysis of the file system layout.

5. The method of claim 1, wherein the hint information comprises an indication for the non-volatile memory system that a sequence of logical block addresses that the host system will subsequently send in write commands to the non-volatile memory system will not frequently change.

6. The method of claim 1, wherein the application sends the hint information to the non-volatile memory system as part of the write command sent to the non-volatile memory system.

7. The method of claim 1, further comprising:
generating an indication for the non-volatile memory system of a sequence of logical block addresses that is associated with read commands that the host system will subsequently send to the non-volatile memory system.

8. The method of claim 1, further comprising
generating an indication for the non-volatile memory system that a sequence of write commands that the host system will subsequently send to the non-volatile memory system will replace data of a file already stored at the non-volatile memory system.

9. The method of claim 1, further comprising
generating an indication for the non-volatile memory system that a sequence of write commands that the host system will subsequently send to the non-volatile memory system will be appended to a file that is already stored at the non-volatile memory system.

10. The method of claim 1, wherein the application: does not initiate the write command.

11. The method of claim 1, wherein the at least one of metadata or payload data associated with the write command is at least one of metadata or payload data for a file that is associated with the write command.

12. The method of claim 1, wherein the non-volatile memory system comprises a three-dimensional memory.

13. A host system comprising:
a processor configured to execute a hint generator separate from a file system of the host system, wherein, when executed, the hint generator is configured to:
analyze a layout of the file system to determine characteristics of different logically-contiguous areas in the layout of the file system;
send, to a non-volatile memory system in communication with the host system, the determined characteristics of the different logically-contiguous areas in the layout of the file system;
generate, based on at least one of metadata or payload data associated with a write command that the host system is going to send to the non-volatile memory system, information regarding a characteristic of data associated with the write command; and
send, to the non-volatile memory system, the generated information in conjunction with the host system sending the write command to the non-volatile memory system.

14. The host system of claim 13, wherein the hint generator is configured to send the generated information to the non-volatile memory system as part of the write command sent to the non-volatile memory system.

15. The host system of claim 13, wherein the at least one of metadata or payload data associated with the write command is at least one of metadata or payload data for a file that is associated with the write command.

16. The host system of claim 13, wherein the hint generator is further configured to:
analyze an install package to identify one or more files associated with the install package;
for each of the one or more files, identify a characteristic of the file; and
generate the information based on the characteristic of each of the one or more files.

17. The host system of claim 13, wherein the non-volatile memory system comprises a three-dimensional memory.

18. A host system comprising:
means for analyzing a layout of a file system of the host system to determine characteristics of different logically-contiguous areas in the file system layout;
means for sending, to a non-volatile memory system in communication with the host system, the determined characteristics of the different logically-contiguous areas in the file system layout;
means for determining whether the host system will send a write command to the non-volatile memory system;
means for, in response to determining that the host system will send the write command to the non-volatile memory system, analyzing at least one of metadata or payload data associated with the write command;
means for generating hint information based on the analysis of the at least one of metadata or payload data; and
means for sending the hint information to the non-volatile memory system.

19. The host system of claim 18, wherein the write command is part of a procedure to install an application on the non-volatile memory system.

20. The host system of claim 18, further comprising means for analyzing the file system layout to determine if the file system layout has changed since a previous analysis of the file system layout.

21. The host system of claim 18, further comprising means for generating an indication for the non-volatile memory system of a sequence of logical block addresses that is associated with read commands that the host system will subsequently send to the non-volatile memory system.

22. The host system of claim 18, wherein the non-volatile memory system comprises a three-dimensional memory.

* * * * *